United States Patent
Sztankay et al.

[11] 3,734,592
[45] May 22, 1973

[54] HIGH INTENSITY LIGHT LIMITING DEVICE

[75] Inventors: Zoltan G. Sztankay, Annandale, Va.; Richard J. Holland, Washington, D.C.; John P. Swirczynski, Adelphi, Md.

[73] Assignee: The United States of America as represented by the Secretary of the Army, Washington, D.C.

[22] Filed: June 21, 1971

[21] Appl. No.: 154,798

[52] U.S. Cl. .................. 350/17, 350/50, 350/160
[51] Int. Cl. ............................................. G02b 17/00
[58] Field of Search .............. 350/50, 160 R, 17; 331/94.5 Q

[56] References Cited

UNITED STATES PATENTS

| 3,301,624 | 1/1967 | Morriss | 350/52 |
| 3,561,842 | 2/1971 | Horton | 350/160 R |
| 3,213,752 | 10/1965 | Ruderman | 350/160 R X |
| 3,289,099 | 11/1966 | Masters | 331/94.5 |
| 3,455,627 | 7/1969 | Letter | 350/160 R |
| 3,602,576 | 8/1971 | Kohler et al. | 350/160 R |

FOREIGN PATENTS OR APPLICATIONS

| 1,008,952 | 11/1965 | Great Britain | 350/202 |

*Primary Examiner*—David H. Rubin
*Attorney*—Harry M. Saragovitz et al.

[57] ABSTRACT

An optical device for limiting the transmission of high intensity light radiation through an optical system is disclosed. The device includes a limiting mirror consisting of a thin evaporative partially absorbing, partially reflective coating deposited on a radiation absorbing substrate. An objective lens is provided to focus incident light on a portion of the limiting mirror to maximize the energy density of the incident light beam. If the energy density of the focused beam exceeds a predetermined level, a small portion of the reflective coating is vaporized, markedly reducing the reflectivity of that portion of the limiting mirror. A portion of the substrate material may also be vaporized if the focused beam is of a particularly high energy density.

8 Claims, 7 Drawing Figures

PATENTED MAY 22 1973 3,734,592

INVENTORS
ZOLTAN G. SZTANKAY
RICHARD J. HOLLAND
JOHN P. SWIRCZYNSKI

BY *Harry M. Saragovitz*
*Edward J. Kelly*
*Herbert Berl*
*Saul Elbaum*   ATTORNEYS

HIGH INTENSITY LIGHT LIMITING DEVICE

RIGHTS OF GOVERNMENT

The invention described herein may be manufactured, used, and licensed by or for the Government of the United States for governmental purposes without the payment to us of any royalty thereon.

BACKGROUND OF THE INVENTION

1. Field of the Invention

This invention relates generally to optical protective devices, and more particularly to an optical device which inhibits the transmission of light radiation of a high energy density.

2. Description of the Prior Art

Modern technology has resulted in the development of a number of devices capable of producing flashes or rays of extremely intense light radiation which can destroy virtually instantaneously the human eye or other sensitive optical apparatuses upon which such radiation happens to fall. For example, it is well known that atomic weapons produce amazingly intense flashes of light upon their detonation. More common sources of high energy light are modern laser systems now in use in large numbers commercially for performing a wide variety of important activities, ranging from eye surgery to boring holes in steel. Lasers are also currently used by the military in range-finders and some types of communications systems. In the future, it is anticipated that high energy laser devices may even be used directly as ray type weapons.

As a consequence of the widespread use of lasers and other devices capable of generating intense light radiation, it has become important to develop a device for protecting the human eye, as well as highly sensitive optical equipment, from damage inflicted either accidentally or intentionally by high energy light sources. To be effective, such a protective device must be responsive over a wide spectral range, must be capable of nearly instantaneous response, and yet must not seriously interfere with normal vision in the absence of intense light radiation.

In the past a wide variety of devices have been proposed to provide such needed protection. Among these are dyed plastic or glass filters. These act instantaneously, but are wave length dependent systems which are only effective in blocking narrow bands of radiation. In addition, they tend to interfere with normal vision, by limiting normal light transmission and by distorting colors. Electronic image converters have also been proposed, but they are far too bulky and expensive for use with anything but the largest and most complicated types of equipment. Optical elements have also been developed which include diphasic materials. Diphasic materials absorb energy from impinging radiation beams, thereby becoming heated and eventually destroying the optical qualities of the elements in which they are implanted. Such devices, however, have a tendency to react somewhat slowly and can be unreliable in certain circumstances.

In a more practical vein, U.S. Pat. No. 3,561,842 broadly describes various systems whereby the light beam is made to reflect from or pass through any one of a number of different elements whose optical properties are directly altered by a high intensity beam. Of particular interest is a disrupter element which may be a thin metallic film made of aluminum for example or it may be a thin film of suitable plastic. Also of interest is a disruptive element made by bonding a light transmissive or reflective film to a roughened substrate. The present invention concerns a practical embodiment of a disruptive element similar in principle to the ones just described, but different in physical form. The differences are crucial in enabling the present invention to function at low enough light intensities to provide real protection.

SUMMARY OF THE INVENTION

Accordingly, one object of this invention is to provide a novel optical element which inhibits the transmission of high energy light radiation.

Another object of this invention is to provide a novel optical protective element which reacts nearly instantaneously to the impingement of high energy light beams.

A further object of this invention is to provide a novel optical protective element which is responsive over a wide frequency spectrum.

Yet another object of this invention is the provision of a novel optical protective element which does not distort normal vision in the absence of high energy light radiation.

A still another object of the invention is the provision of a novel optical protective element which is both fast acting and reliable although inexpensive to manufacture.

Briefly, these and other objects of the invention are achieved by constructing an optical system including at least one lens and a limiting mirror comprised of a radiation absorbing substrate material with an evaporative reflective coating deposited thereon. The coating is partially radiation absorbing and partially radiation reflecting. When damaging radiation enters the system, the lens focuses the damaging radiation to a small spot on a limiting mirror, thereby evaporating its reflective surface due to a temperature rise caused by the absorption of radiation in the coating thereby preventing further transmission of the damaging radiation beam.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings wherein.

DESCRIPTION OF THE PREFERRED EMBODIMENT

Figure 1:
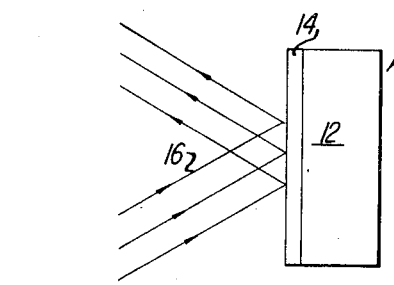
FIG. 1 is a cross sectional view of the limiting mirror of the instant invention.

Referring now to the drawings wherein like reference numerals designate identical or corresponding parts throughout the several views, and more particularly to FIG. 1 thereof, a limiting mirror 10 is shown in cross section. The limiting mirror 10 includes a backing element or substrate 10 preferably formed of a black substance having radiation absorbing characteristics and having a specular surface. For example, substrate 10 may be formed of black dyed Mylar (TM) or black dyed cellulose nitrate plastic. The thickness of the substrate 12 may vary over a considerable range. For example, when Mylar is used, a thickness of about $10^{-3}$ cm has been found adequate while a thickness of about $0.2 \times 10^{-3}$ cm has been found adequate when cellulose nitrate is used. An evaporative reflective coating 14 is deposited on one surface of substrate 12 by conventional vacuum coating techniques, for example. The coating 14 may, for example, be a very thin layer of aluminum on the order of 150 angstrom units (A) thick. Of course, various other materials may be used to form the reflective coating, and various thicknesses of the materials may be used depending upon the circumstances in which the limiting mirror is to be used. The important features of the coating 14 are that it must provide a high quality optical reflecting surface, yet must be capable of vaporizing reliably when exposed to light of a predetermined energy density. A plurality of light rays, or a beam of light 16 is shown impinging upon and being reflected by evaporative coating 14.

The mass of material per unit area of the film must be very small for the material to vaporize at the energy densities necessary for eye protection. The coating must therefore by extremely thin (on the order of 150 A for aluminum), too thin for a self supporting mirror surface metal film. Furthermore, the requirement for the extreme thinness of the metal arises also because only for these very thin films does the reflection coefficient decrease enough so that a significant fraction of the light enters the film and can thus be absorbed to heat it.

It is thus seen that a substrate to support the film is a crucial requirement. Because the film is so thin, the substrate cannot be roughtened but must itself have a specular surface, otherwise it would not be possible to have a mirror surface on the film. However, the plastic material of the substrate reflects a much smaller fraction of the light incident on it than the metal, so this remaining reflection subsequent to vaporization of the metal presents no danger for intensities near the eye damage threshold level. At higher intensities of the incident light, on the other hand, the substrate will itself be vaporized if its thickness is not too large. To enhance this process a black substrate is used to improve its light absorption, and it is made as thin as possible, compatible with the requirements of support for a mirror surface.

Figure 2:
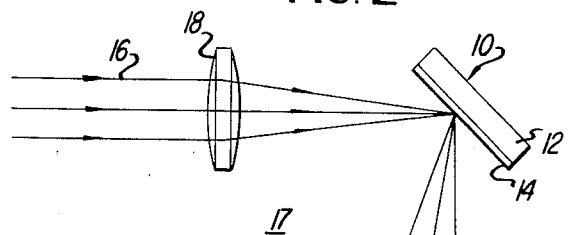
FIG. 2 is a schematic illustration of a first optical system employing a limiting mirror according to the instant invention.

Referring now to FIG. 2, an optical system 17 illustrating the use of the limiting mirror 10 is shown. This particular system is conceptually simply and will be used to illustrate the principles involved, although it functions only for beams incident very nearly parallel to the axis of the system. In the optical system 17, incident light radiation 16 strikes an objective lens 18, a conventional achromatic lens, for example, which focuses the light beam 16 to a point or small area on the surface of limiting mirror 10. This focusing operation is used to maximimize the energy density of the incoming radiation beam on the evaporative coating 14 of limiting mirror 10. Limiting mirror 10, which is oriented at an angle to the axis of lens 18, reflects the focused beam from lens 18 to another conventional achromatic lens 20 which performs a beam expanding or defocusing function. The defocused light beam emerging from lens 20 is essentially identical to incoming light beam 16, although it is somewhat reduced in brightness due to normal absorption in its passage through the optical system 17. The expanded beam emerging from lens 20 is reflected from a conventional mirror 22 toward an optical instrument or a human eye 24. Thus, under normal conditions, light which falls upon objective lens 18 is transmitted through the optical system 17 and is presented to the eye or apparatus 24 in a virtually undistorted manner.

However, if the input beam 16 includes light radiation having an energy density above a predetermined threshold level, the focused beam impinging upon limiting mirror 10 will have a sufficient energy density to vaporize a portion of the reflective coating 14. For a Q-switched laser, the threshold level is a function of the surface reflectivity, the light absorption coefficient of the coating, the thickness and density of the coating, its heat capacity, the energy required to produce phase changes, and the temperature at which these phase changes occur. For lower power sources of longer time duration the time rate of the energy delivery and the heat conductivities of the coating and substrate are also important. For very high energy beams the aforementioned physical properties of the plastic substrate are also important, as it is then also required to vaporize the substrate to prevent eye damage due to reflection of some of the light by it.

As a result of this vaporization, virtually none of the damaging radiation will be reflected from the mirror 10 to the lens 20 and subsequently to the eye or instrument 24. In this manner the system 17 protects the eye or instrument 24 from light beams of a dangerous energy level. It will be understood, however, that the vaporization process described above does not result in total destruction of the limiting mirror 10. This is because high energy light sources generally have relatively small cross sectional areas with respect to a complete field of view. Thus, the objective lens 18, in focusing the impinging high energy beam, serves to confine its vaporizing effect to a very small region of mirror 10, and consequently, if vaporization of the reflecting surface does take place, it will normally be limited to only a small region of the limiting mirror. As a result, light from the remaining field of vision will still be transmitted through the system. The effect of the limiting mirror is therefore, to maintain continuous transmission of light from a normal field of view while eliminating transmission of high intensity, or possibly damaging light radiation. Thus, in using the instant invention, the eye or instrument 24 receives a normal field of view in a more or less undisturbed state except, that the point from which the damaging radiation eminates is blacked out.

Naturally, the ability to set the precise energy level at which vaporization takes place, and to limit the energy density of the radiation that passes through the system to a safe level is very important. In selecting the threshold of vaporization, it was first observed that the Surgeon General's Office had discovered that the maximum energy density in the visible region projected from a Q-switched laser which does not cause retinal damage to the human eye is on the order of $10^{-7}$ joules per square centimeter ($J/cm^2$). Energy levels above this fugure were found likely to cause retinal lesions. Of course, even the most sensitive optical instruments are generally capable of withstanding somewhat higher energy levels without damage.

Experimental results with Q-switched lasers have shown that aluminum coated mirrors on black plastic substrates being vaporizing at around or below $1J/cm^2$. The $1J/cm^2$ threshold of vaporization means that to limit the transmissivity of the system to energy densities no higher than $10^{-7}J/cm^2$, the focusing gain must be $10^7$. This focusing gain can be achieved using a 3cm aperture system focusing to a $10^{-3}$cm diameter spot, for example. If the energy density requirement is either below or above $10^{-7}J/cm^2$, the aperture can be increased or decreased, the focusing can be changed correspondingly, or the aluminum film itself can be made thicker or thinner. It has been found, for example, that using a focusing gain of $10^7$, obtained as described above, a $10^{-7}J/cm^2$ threshold of vaporization can be obtained if an aluminum coating 150A thick is used.

TABLE 1 gives further experimental results for one of the limiting mirrors tested. TABLE 1 is written with the eye protection standard mentioned above in mind, but, of course, the data in the table are applicable to other requirements as well. If it were desired to protect equipment other than the eye, the last column would than refer to the energy density or power density at the detector, image converter, camera, etc. instead of at the cornea. If a higher threshold energy density level than $10^{-7}J/cm^2$ is required, less focusing would be used, the aperture would be reduced or limiting mirrors having thicker reflective coatings would be employed.

All data in TABLE 1 was compiled using a Q-switched ruby laser.

TABLE 1

SAMPLE: NPC Al coated, dyed pellicle, $2\mu$ thick; 50% passive reflectance; 50% substrate absorptivity

| Energy density at mirror Q-switched ruby laser | Fraction reflected | Energy density at cornea after passing through device damaged threshold $1 \times 10^{-7} J/cm^2$ at cornea |
|---|---|---|
| 0.23 $J/cm^2$ | 50% | $0.12 \times 10^{-7} J/cm^2$ |
| 1.5 $J/cm^2$ | 12% | $0.18 \times 10^{-7} J/cm^2$ |
| 10.5 $J/cm^2$ | 4.5% | $0.47 \times 10^{-7} J/cm^2$ |
| 43 $J/cm^2$ | 1.3% | $0.56 \times 10^{-7} J/cm^2$ |

The first column of TABLE 1 gives the focused peak energy density incident on limiting mirror 10. The second column gives the percent of the energy on the limiting mirror that is reflected by the mirror. The percent of energy reflected by the limiting was found to start at about 50 percent and gradually decline with increasing incident energy as shown by the table. The last column gives the energy density that would be transmitted to the eye after reflection from the limiting mirror and after defocusing. For example, a $43 \times 10^{-7}J/cm^2$ beam impinging on the system would be focused to $43J/cm^2$ on the limiting mirror, 1.3 percent of it would be reflected, and after defocusing equal to the original focusing, an energy density of $0.56 \times 10^{-7}J/cm^2$ would be passed on to the eye. The energy density reaching the eye is thus well below the danger level, while the initial energy of the impinging light beam was about 43 times the damage threshold level.

TABLE 2 lists experimental results obtained using a non-Q-switched ruby laser. It will be noted that with a non-Q-switched laser, the damage threshold is increased to $10 \times 10^{-7}J/cm^2$.

TABLE 2

SAMPLE: NPC Al coated dyed pellicle, $2\mu$ thick; 50% passive reflectance; 50% substrate absorptivity

| Energy density at mirrow Non-Q-switched ruby laser | fraction reflected | Energy density at cornea after passing through device damaged threshold $10 \times 10^{-7}$ |
|---|---|---|
| 7.5 $J/cm^2$ | 14% | $1 \times 10^{-7} J/cm^2$ |
| 45 $J/cm^2$ | 5.1% | $2.3 \times 10^{-7} J/cm^2$ |
| 195 $J/cm^2$ | 1.1% | $2.2 \times 10^{-7} J/cm^2$ |

TABLE 3 lists experimental results obtained using a He-Ne gas continuous wave laser.

TABLE 3

SAMPLE: NPC Al coated dyed pellicle, $2\mu$ thick; 50% passive reflectance; 50% substrate absorptivity

| Energy density at mirror Ne-He gas CW laser | Fraction reflected | Energy density at cornea after passing through device damage threshold $10 \times 10^{-7} J/cm^2$ first 1 ms $100 \times 10^{-7} W/cm^2$ CW |
|---|---|---|
| 300 $W/cm^2$ | 50% first 1.0 ms | $0.15 \times 10^{-7} J/cm$ in 1.0ms |
| | 8% next 80 ms | $24 \times 10^{-7} W/cm^2$ next 80 ms |
| | 3% residual | $10 \times 10^{-7} W/cm^2$ residual |

The damage threshold for the continuous wave gas laser, as listed in TABLE 3 is $10 \times 10^{-7}J/cm^2$ for the first millisecond or $100 \times 10^{-7}W/cm^2$.

The gas laser data of TABLE 3 shows that it took 1.0ms to evaporate the film, bringing the reflectivity down from 50 percent to around 8%. The energy density delivered in this time, which corresponds to a typical normal laser pulse length, is well below the damage threshold. The power level for the next 80ms, which is about how fast the eye would blink, is well below the CW damage level (still making the same assumptions about focusing), and is later further reduced.

It is important to note, that in experimental tests of the limiting mirror of the insant invention, the drop in reflectivity occurs almost exactly at the time the pulse of damaging energy is received. Thus no time lag was observed in experiments with up to $10^{-9}$ seconds time resolution.

The instant invention includes various radiation limiting features in addition to vaporization of reflective coating 14. For example, a further safety feature is built into the limiting mirror is that the reflectivity of aluminum decreases with temperature, even prior to its eventual evaporation. Thus if light having an energy density lower than the threshold of evaporation impinges on the limiting mirror 10 the light energy will tend to heat the aluminum coating 14 thereby reducing its overall reflectivity and somewhat reducing the energy transmitted to the eye or instrument 24.

If impinging light radiation has a very high energy density, even after the aluminum or metal layer 14 has evaporated, residula reflection from backing or substrate 12 may still permit light energy above the damaged threshold to pass through optical system 17. As a protection against this eventuality, the substrate material 12 itself is made of a relatively thin radiation absorbing material. For example, if black dyed Mylar plastic is used a thickness of about $10^{-3}$cm has been found ideal, while if dyed cellulose nitrate plastic is used, a thickness of $0.2 \times 10^{-3}$cm has been found ideal as described hereinabove. Using such thicknesses of substrate material, very high energy density radiation not only vaporizes the reflective coating 14, but also vaporizes a small portion of the substrate material 12, leaving a hole through it. The formation of a hole, of course, prevents any energy from being reflected from that spot and thus prevents any damaging energy from reaching the eye or instrument 24. Since it is thus anticipated that the substrate material 12 may enter into the radiation protective process, it should be emphasized that the substrate material should be black in color to absorb as much light energy as possible, and thus to vaporize as soon as possible after a high energy beam strikes it.

At still higher energy densities, the air in the focal volume itself becomes ionized, and a breakdown region is therefore formed. This ionized air is itself a strong absorber of light energy and may further aid in the attenuation of the impinging high energy density beam.

It will be observed that the optical system disclosed herein is designed essentially to provide protection from high energy density beams in the visible light spectrum. However, the system inherently provides additional protection for energy beams in the infra-red and ultra-violet spectra since in these regions the glass surfaces in the system tend to absorb larger amounts of energy from the incident radiation. Of course, the instant invention can be designed to have a primary effect in regions outside the normal visible light spectrum. For example, it may be made sensitive to laser radiation in the near infra-red range. However, even if sensitivity in this range is not as high as in the visible range, this face is compensated for by the fact that the retinal damaged thresholds of the eye are correspondingly higher in the near infra-red region.

The optical system 17 illustrated in FIG. 2 is somewhat limited in that it would be most effective in protecting against lasers or other high energy density light beams aimed directly along the central axis of lens 18, but would be less effective in protecting against lasers directed at lens 18 at an angle to its axis, due to the angular orientation of limiting mirror 10. Accordingly, a pluality of additional optical systems are illustrated in FIGS. 3-7 which improve various aspects of the functioning of the instant invention.

The following optical systems will be described essentially in terms of their normal operation with visible light of normal, non-dangerous energy densities. It will be understood, of course, that the operation of the limiting mirror in each optical system is the same at high energy densities as described herein above.

Figure 3:
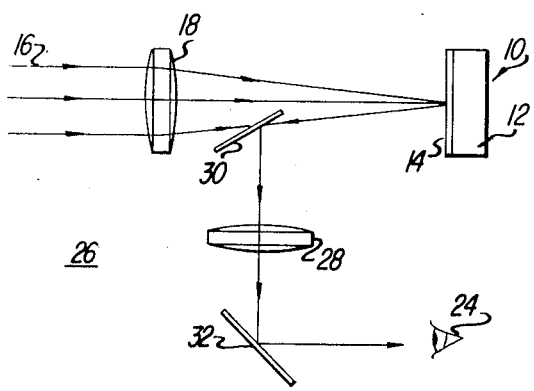
FIG. 3 is a schematic illustration of a second optical system employing a limiting mirror according to the instant invention.

Referring now to FIG. 3, an optical system 26 is illustrated. Optical system 26 includes an objective lens 18 and a defocusing lens 28 both of which have identical focal lengths. This focal length is equal to the distance from lens 18 to limiting mirror 10, and is also equal to the distance from limiting mirror 10 to conventional mirror 30 and then to defocusing lens 28. Thus in operation, when the light energy is below the damaged threshold, the incoming light beam 16 is focused by lens 18 on limiting mirror 10. From mirror 10 the light beam is reflected to mirror 30 and then to defocusing lens 28. Defocusing lens 28 expands the beam to its original size and permits it to fall upon a second conventional mirror 32, which reflects the beam to the eye or instrument 24. It is noted that mirrors 30 and 32 could be replaced by conventional prisms where desirable. The effective or projected area selected for conventional mirror 30 depends upon the application of the system. For eye protection, the projected area (that is the area normal to the input axis) of mirror 30 could be about one tenth of the aperture of lens 18. Then if the aperture of lens 18 is, for example, 3cm., lens 28 would have an effective aperture of about 1cm. This is larger than the pupil diameter of the eye, so that the eye would view the scene in full brightness, except for the reflection loss of the limiting mirror and other optical losses.

This design protects against off-axis beams, as they will also focus on the limiting mirror, although not at the center thereof.

Figure 4:
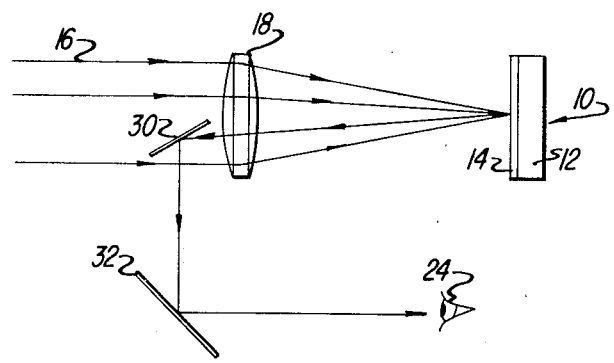
FIG. 4 is a schematic illustration of a third optical system employing a limiting mirror according to the instant invention.

Referring now to FIG. 4, another optical system is illustrated in which the defocusing lens 28 of the FIG. 3 embodiment has been eliminated. In the FIG. 4 embodiment, mirror 30 is positioned on the input side of objective lens 18. Thus in operation, objective lens 18 serves both a focusing and a defocusing function. That is, the incident beam 16 initially passes through lens 18 and is focused upon limiting mirror 10. A portion of the beam is then defocused by reflection back through lens 18 to mirror 30. The defocused beam is then reflected to the second conventional mirror 32 and then to the eye or instrument 24. This embodiment, although it uses fewer parts, causes a portion of the aperture of lens 18 to be blocked by the positioning of mirror 30.

Figure 5:
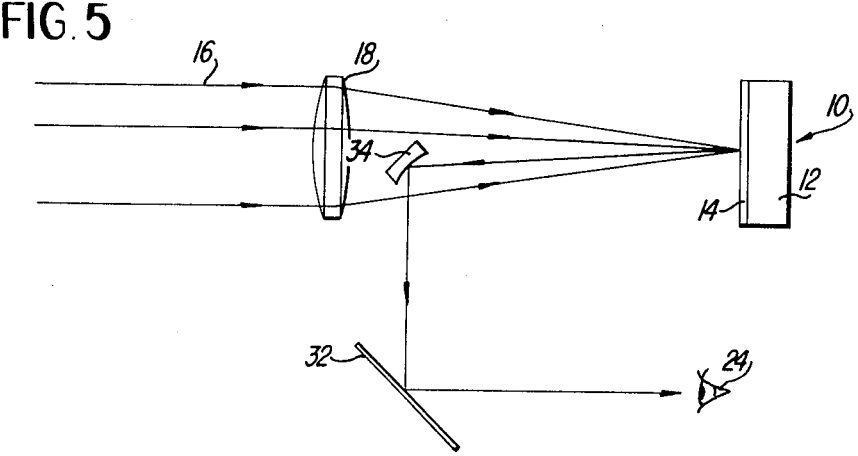
FIG. 5 is a schematic illustration of a fourth optical system employing a limiting mirror according to the instant invention.

The embodiment of FIG. 5 is similar to that of FIG. 3 except that the function of the defocusing lens 28 and of the angled mirror 30 have been combined into a curved mirror 34. Thus the curved mirror 34 serves no only to reflect the beam from limiting mirror 10 toward mirror 32, but it also serves to defocus the beam.

Figure 6:
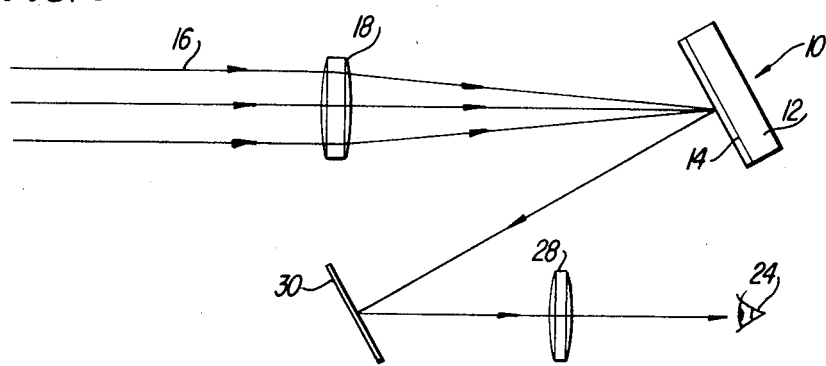
FIG. 6 is aschematic illustration of a fifth optical system employing a limiting mirror according to the instant invention.

Yet another optical system is illustrated in FIG. 6. This embodiment of the invention is similar to that of FIG. 2 in that mirror 10 is tilted with respect to the axis of objective lens 18. However, in the FIG. 6 embodiment, the focal length of objective lens 18 is substantially greater than in the embodiment of FIG. 2, permitting the limiting mirror 10 to be tilted at a small angle and still remain in focus throughout its area. This permits the removal of mirror 30 from the incoming light beam. Thus in the FIG. 6 embodiment, mirror 30 does not block either a portion of the impinging beam or a portion of the focused beam, as in the embodiments of FIGS. 3, 4 and 5. In the FIG. 6 embodiment the light reflected from mirror 30 passes through a defocusing lens 28 to the eye or instrument 24.

Figure 7:
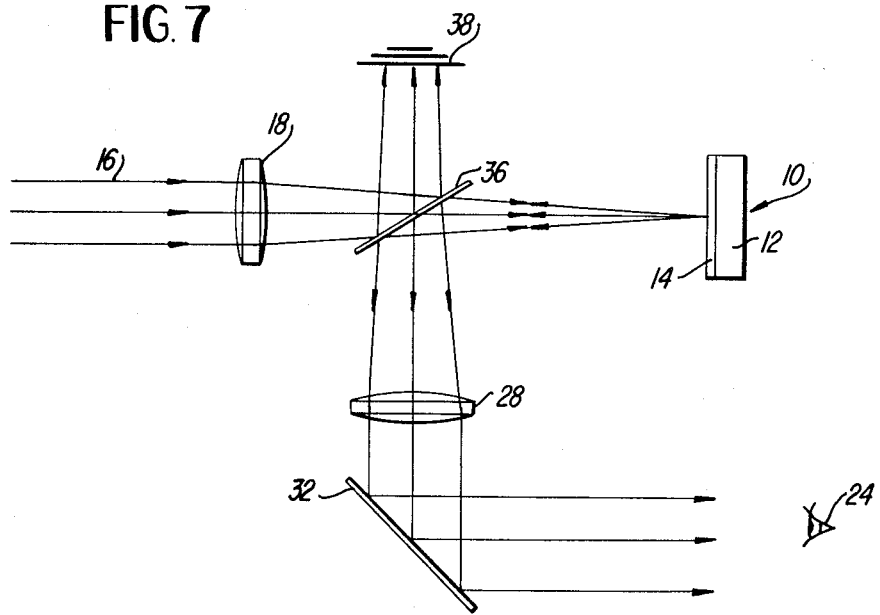
FIG. 7 is a schematic illustration of a six optical system employing a limiting mirror according to the instant invention.

A somewhat different optical configuration is illustrated in the schematic diagram of FIG. 7. In the FIG. 7 device a beam splitting, or partially silvered mirror 36 is placed directly in the focused beam emerging from objective lens 18. Thus a portion of the incoming beam is reflected from the beam splitting mirror 36 toward an optical ground or light absorbing area 38 where it is lost. The remaining beam is focused on limiting mirror 10 and is then reflected back to the opposite surface of beam splitting mirror 36 to be reflected to defocusing lens 28. As in previous embodiments, the light from defocusing lens 28 is reflected from the conventional mirror 32 to the eye or instrument 24. The advantage of this system is that it permits a substantially larger field of view to be obtained. In this regard it is noted that the positioning of the beam splitter is not critical, as it will not limit the field of view no matter where it is placed. The disadvantage of this system is that there is a substantial brightness loss due to the use of the beam splitter. For example, if a 50/50 beam splitter is used and other normal optical losses are taken into effect, such as the reflectivity losses at the various other mirrored surfaces, the brightness reaching the eye or instrument 24 may be reduced to 10 percent of the original brightness. However, if the transmission of total energy rather than the brightness or total energy density of the beam is most important, this device would be the best of the illustrated devices since the entire cross section of the beam is picked up and passed through to the eye or instrument 24. Thus, this system would probably be the best for situations in which no actual imaging was required, and only the energy input is to be measured, such as in various types of light detectors.

It will be understood, of course, that all of the optical systems described in the case are described in their simplest form. Actual systems would use complex lenses to correct for chromatic and other aberrations, as is commonly known to those skilled in the art. In addition it will also be apparent to those skilled in the art that conventional substitutions of focusing mirrors where lenses are shown is also possible. In addition it should also be apparent that the diagrams shown are not intended to be an exhaustive list of the possible optical systems using the instant invention, but only show various ways of employing a limiting mirror in transmitting optical information to a viewer or to an instrument. It will also be apparent that more complex optical systems may be needed where a wider field of view is required.

Obviously, numerous additional modifications and variations of the present invention are possible in light of the above teachings. It is therefore to be understood that within the scope of the apended claims the invention may be practiced otherwise than as specifically described herein.

What is claimed as new and desired to be secured be letters patent of the United States is:

1. An optical device for limiting the transmission of high energy density radiation comprising:
   limiting mirror means for normally reflecting radiation incident thereon, said limiting mirror including
   a black-dyed plastic radiation absorbing substrate material,
   a reflective coating deposited on the front surface of said substrate material facing the incident radiation, said reflective coating designed to vaporize when subjected to radiation of a predetermined energy density; and
   an objective lens positioned in the path of radiation incident upon said limiting mirror means for increasing the energy density of said incident radiation, said objective lens having an axis parallel to the axis of said limiting mirror for insuring that off-axis beams will focus on said limiting mirror.

2. An optical device as in claim 1, wherein:
   said reflective coating comprises a layer of aluminum approximately 150 angstrom units thick.

3. An optical device as in claim 1, wherein:
   said radiation absorbing substrate material is designed to vaporize when subjected to radiation energy densities greater than said predetermined energy density.

4. An optical device as in claim 1, further comprising:
   defocusing means positioned in the path of radiation reflected from said limiting mirror means for reducing the energy density of said reflected radiation.

5. An optical device as in claim 4, wherein:
   said objective lens and said defocusing means comprise a single lens.

6. An optical device as in claim 4, wherein:
   said defocusing means comprises a mirror.

7. An optical device as in claim 4, further comprising:
   conventional mirror means positioned to intercept radiation reflected from said limiting mirror means for directing said reflected radiation toward said defocusing means.

8. An optical device as in claim 7, wherein:
   said radiation absorbing substrate material comprises a sheet of black dyed plastic in the range of from $10^{-5}$ to $10^{-3}$ centimeters thick.

* * * * *